Oct. 25, 1927. Re. 16,778

G. C. KELLEY

APPARATUS FOR TREATING OIL

Original Filed Aug. 9, 1920

WITNESS

G. V. Rasmussen

INVENTOR

GEO. C. KELLEY

BY

Brisen & Schenck

ATTORNEYS

Reissued Oct. 25, 1927. Re. 16,778

UNITED STATES PATENT OFFICE.

GEORGE C. KELLEY, OF TAFT, CALIFORNIA.

APPARATUS FOR TREATING OIL.

Original No. 1,465,398, dated August 21, 1923, Serial No. 402,467, filed August 9, 1920. Application for reissue filed May 5, 1925. Serial No. 28,252.

This invention relates to a process and apparatus for the treating of oils to facilitate the separation of undesirable concomitants such, for example, as the water which constitutes a part of the body of oil, or of emulsions contained in the oil where the oils to be treated are taken directly from oil wells. The treatment of the oil, speaking generally, involves a reduction of the viscosity of the oil. Although the invention will be described with reference to oils taken directly from oil wells, it is to be understood that the process and apparatus of this application are equally applicable in cases of other oils presenting similar problems to those which confront the operator in dealing with mineral oils from oil wells. The new process and apparatus are adapted and applicable to the treatment of oils generally which contain emulsions or other undesirable concomitants which stubbornly resist separation until the viscosity of the oils is reduced by the application of heat.

Referring now more particularly to oil taken from oil wells, it has been found that there are usually present various proportions of emulsion and there are also present various proportions of water in suspension that it has been attempted to separate out from the oil by various systems and apparatus. A common system and form of apparatus for aiding in the separation of the water consists in leading the oil from the well to a heating tank of considerable size and in which there is arranged a heating means, generally steam pipes, but it has been found that by that system the percentage of emulsion is greatly increased and which, therefore, requires additional time with unsatisfactory results for the breaking down of the emulsion.

It is one of the objects of the present invention to provide an improved apparatus for so heating the oil from wells or from storage tanks as to reduce its viscosity without increasing the emulsion in the oil.

A further object of the invention is to provide a system that is of economical cost of operation and high degree of efficiency in facilitating the separation of the water from the oil without increasing the emulsion and to provide an apparatus in which the oil is heated to a predetermined degree and in which the oil is gradually brought to the desired high temperature by a gradual heating consisting of a preliminary application of heat and an ultimate heating step, the oil being caused to pass through the ultimate heating step in a confined column through horizontal passages whereby foaming or ebulition of the oil is prevented, particularly during the period of the time that the oil receives its maximum heat treatment.

A further object of the invention is to provide an improved apparatus for treating crude oil wherein the oil is heated while in a substantially confined passage, therefore presenting a comparatively small volume of the oil for a given period of time to the heating agent and thereby conditioning the oil for a subsequent separation stage, such for example as is to be found in the exposure of the oil treated as aforesaid, to an electrostatic field action in which the emulsion is broken up.

A further object is to provide an apparatus involving an elongated and, if desired, circuitous passage having diameters small as compared with the length of the passage and having means for heating and regulating the heat of the passage and, further, for the transfer of heat to the oil before it passes the passage.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Referring to the drawings.

By the present invention, crude oil that may have been previously drawn from a well, or wells, into a storage tank, is directed into a heating apparatus in such manner that a column of oil of relatively small transverse area and of indeterminate length is caused to move in the presence of heat which latter is regulated preferably to a temperature less than the boiling point of water and which temperature is found most efficient when maintained at about 190° F. By this process and in the disclosed form of apparatus the viscosity of the crude oil is so materially reduced without increment in the proportion of emulsion which is, obviously, of great advantage as being economical both in time and expense of treatment of the oil to secure the final separation of water and breaking down of the emulsion.

Figure 2:
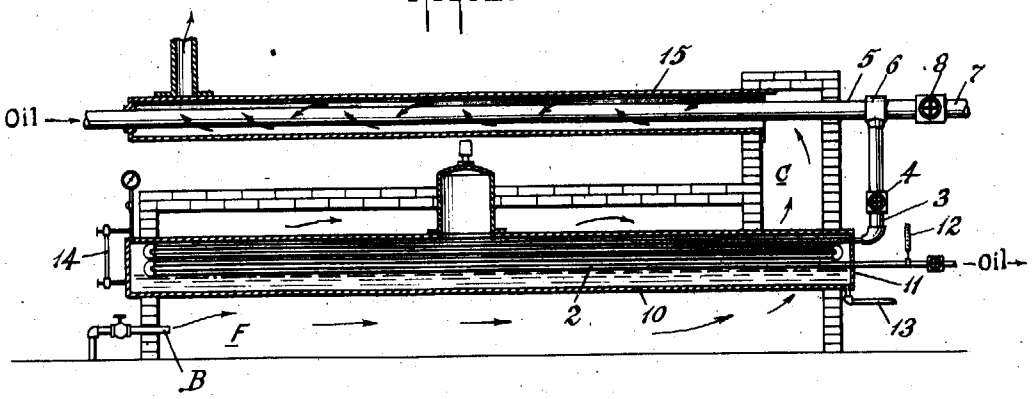
Fig. 2 is a longitudinal, vertical section and partial elevation of a heating apparatus and heat exchange means.
Figure 1:
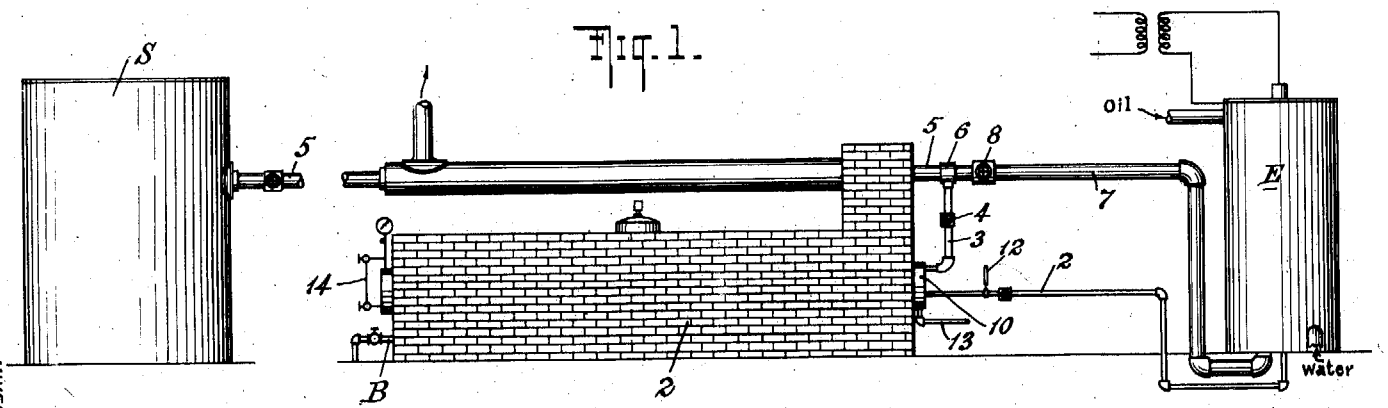
Fig. 1 is a diagrammatic and elevational view of the apparatus.

The form of apparatus includes, in the illustrated embodiment, an elongated passage 2, shown as formed of piping having a transverse area with diameters small in comparison with the length of the passage and which passage is, in the present case, shown as circuitous and arranged to be heated by suitable means. One end of the passage 2 is connected to a branch pipe 3 in which is provided a valve 4 and which branch is connected to a feed pipe 5 of relatively large size as compared with the transverse area of the passage 2 and this feeder pipe 5 may be extended to any source of the supply for oil to be treated as, for instance, the storage tank S, Fig. 1.

The feeder pipe 5 may be extended from its connection 6 with the branch 3 as by means of a direct connection 7 in which connection there may be provided a cut-off valve 8 so that the flow of oil may be interrupted and directed to the branch 3 when the valve 4 is opened, so that the oil will be caused to flow through the comparatively constricted and elongated passage 2.

The passage 2 may be heated by any suitable means. There is shown a drum 10, into the end 11 of which the passage 2 is led and out of which it passes, the out-flowing oil portion of the passage being provided with a thermometer 12 to indicate the temperature of the oil. The drum 10 is provided with a water supply pipe and blow-off 13, shown as attached to the end 11, and the front end of the drum is provided with a water level gauge 14.

The drum is mounted in the illustrated form horizontally in a furnace F that may be heated by the combustion of oil at a burner or burners B adjacent the front end of the furnace and at the rear end of the latter there is provided a chimney C having a horizontally extending flue 15 encasing the feeder 5 so that there is a preliminary transfer of heat from the exhaust gases to the oil flowing through the feeder 5 to be subsequently directed into and heated in the passage 2.

The temperature of the oil discharging from the heater may be observed, by a reading of the thermometer 12, and closely regulated by the adjustment of the fuel supply, and the heated oil is then discharged into an electric dehydrating treater.

After the oil is heated it is directed from the pipe 2 into an apparatus known as an electrical treater E in which the oil is subjected to the action of an electrostatic field while it is, at the same time, agitated for the breaking down of the emulsion and the ultimate separation of the oil and water.

From the above, it will be seen that instead of directing the oil from the wells or storage tank into a heating chamber where a large volume of the oil is heated by direct contact with a steam or otherwise heated pipe, by the present process a preferably small volume of oil is presented to the heating agency the temperature of the oil being controlled to a nicety so as to avoid the generation of steam by the increment of the temperature of the water content to the degree necessary.

As the oil passes through the entire apparatus in a column of relatively small transverse area and of indeterminate length through horizontally arranged passages, and as the area of the column is decreased in that part of the apparatus in which the oil receives its maximum heat treatment, it will be obvious that the oil will completely fill the passages through which it passes.

It will further be observed that the oil, when subjected to the treatment described, is first exposed to gradually increasing temperatures and is then confined in tubes of relatively small diameter in which the maximum application of heat to the oil is effected, the diameter of the tubes in which the oil receives its maximum heat treatment being less than that of the tube or tubes in which it is preheated. The result of this treatment is the avoidance of any sudden sharply defined temperature difference in the column of oil as well as assurance that the oil, by the time it reaches that part of the passage in which it receives its maximum heat treatment, will flow through the passage as an uninterrupted stream completely filling said passage during its course therethrough. In other words the tendency of the emulsion to rupture as the result of the heat treatment is resisted or counteracted in the zone of maximum heat treatment by the fact that there is no free space into which volatilization products or steam can pass or escape from the column of oil. In prior processes of which I am aware the arrangement of apparatus and the course of the process is such as to make possible the escape from the body of oil under treatment of volatilization products and steam during the time that the oil receives its maximum heat treatment. My apparatus and process differ from such prior apparatus and processes in that the oil is treated in the form of a confined column of flowing oil wherein, while the oil is conditioned for the separation of undesirable concomitants, said separation is not allowed to take place until after the zone of maximum heat treatment has been passed.

I claim:

1. An apparatus for treating oil to facilitate the separation of undesirable concomitants, comprising, a hot water drum, a horizontally arranged passage for the oil in the drum, said passage being of continuously restricted cross-sectional area so as to avoid free spaces and a consequent turbulent condition in the oil, means for heating the oil as it flows through said passage in an uninterrupted confined column, so as to impart thereto the maximum heat treatment for the desired condition of the oil and a flue for the combustion gases from said heating means having an oil conduit therein arranged as a preheater for gradually heating the oil before it enters into the said passage.

2. An apparatus for treating oil to facilitate the separation of undesirable concomitants, comprising, a hot water drum, a horizontally arranged passage for the oil in the drum, said passage being of continuously restricted cross-sectional area so as to avoid free spaces and a consequent turbulent condition in the oil, means for heating the oil as it flows through said passage in an uninterrupted confined column, so as to impart thereto the maximum heat treatment for the desired condition of the oil, a flue for the combustion gases from said heating means arranged as a preheater for gradually heating the oil before it enters into the said passage, and an oil conduit associated with said flue and connecting with said passage and of greater transverse area than the average transverse area of said passage, said conduit being arranged within said flue as a preheater for gradually heating the oil before it enters into the said passage.

3. An apparatus for heating oil from wells to facilitate the separation of water, comprising a furnace, a hot water drum arranged horizontally in the furnace, an elongated oil passage arranged in the drum and through which oil is caused to flow to be heated, and a heat exchange flue leading from the furnace chimney and in which a preheater is arranged for heating the oil before it passes into the said passage.

4. An apparatus for heating oil from wells to facilitate the separation of water, comprising a furnace, a hot water drum in the furnace, an elongated oil passage arranged in the drum and through which oil is caused to flow to be heated in a small stream, a flue from the furnace, and a feeder leading through the flue to said passage to preheat the oil and being of greater transverse area than said passage.

5. An apparatus for heating oil to facilitate the separation of undesirable concomitants, comprising a furnace, a hot water drum, a flue for the combustion gases from said furnace and a continuous passage for the oil of relatively small cross-sectional area, a portion of said passage being located in said flue and serving to preheat said oil and another portion of said passage being located in said drum, the said other portion of said passage being of smaller cross-sectional area than said first-named portion whereby an uninterrupted column of oil will be confined within and will completely fill said other portion of said passage in a relatively quiescent, non-ebullient state.

6. An apparatus for treating oil to facilitate the separation of undesirable concomitants, comprising a furnace and a drum an elongated substantially horizontal passage of continuously restricted cross-sectional area located in the drum, and a feeder pipe through which the oil flows to said passage and so located as to be exposed to heat of gases developed in the furnace, the cross-sectional area of said feeder pipe being greater than that of said passage whereby the flow of oil through said passage will be constantly maintained as a continuously uninterrupted, confined column in which free spaces and a consequent turbulent condition of the oil are avoided, said passage extending from said feeder pipe to the delivery end of the apparatus, said drum being adapted to contain a heated liquid medium for heating said passage to impart a maximum heat treatment to the oil therein while it is confined within said restricted passage whereby no substantial expansion of said oil will occur in said passage and foaming or ebullition of the oil will be prevented throughout the entire apparatus as it flows therethrough.

7. An apparatus for treating oil to faciliate the separation of undesirable concomitants, comprising a furnace and a drum, an elongated substantially horizontal passage of continuously restricted cross-sectional area located in the drum, and a feeder pipe through which the oil flows to said passage, and so located as to be exposed to heat of gases developed in the furnace and at a level higher than that of the horizontal passage so as to insure the maintenance of a pressure head upon the oil in said passage and a flow of an interrupted column of oil throughout the entire length of the passage, the cross-sectional area of said feeder pipe being greater than that of said passage whereby the flow of oil through said passage will be constantly maintained as a continuously uninterrupted, confined column in which free spaces and a consequent turbulent condition of the oil are avoided, said passage extending from said feeder pipe to the delivery end of the apparatus.

In testimony whereof I have hereunto set my hand.

GEORGE C. KELLEY.